United States Patent
Kim

(10) Patent No.: US 11,951,983 B2
(45) Date of Patent: Apr. 9, 2024

(54) AUTONOMOUS CONTROLLER FOR LATERAL MOTION AND CONTROL METHOD THEREFOR

(71) Applicants: Hyundai Motor Company, Seoul (KR); Kia Corporation, Seoul (KR)

(72) Inventor: Hyun Su Kim, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 213 days.

(21) Appl. No.: 17/480,561

(22) Filed: Sep. 21, 2021

(65) Prior Publication Data
US 2022/0153265 A1    May 19, 2022

(30) Foreign Application Priority Data
Nov. 13, 2020 (KR) .................... 10-2020-0152118

(51) Int. Cl.
| | |
|---|---|
| *B60W 30/12* | (2020.01) |
| *B60W 50/00* | (2006.01) |
| *B60W 50/14* | (2020.01) |
| *B60W 60/00* | (2020.01) |
| *B62D 15/02* | (2006.01) |

(52) U.S. Cl.
CPC ........ *B60W 30/12* (2013.01); *B60W 50/0098* (2013.01); *B60W 50/14* (2013.01); *B60W 60/001* (2020.02); *B62D 15/025* (2013.01); *B60W 2050/0011* (2013.01); *B60W 2050/146* (2013.01); *B60W 2710/20* (2013.01)

(58) Field of Classification Search
CPC . B62D 15/025; B62D 6/003; B60W 2552/30; B60W 2050/0011; B60W 2050/146; B60W 2710/20
See application file for complete search history.

(56) References Cited

U.S. PATENT DOCUMENTS

| | | | |
|---|---|---|---|
| 8,311,729 B2 * | 11/2012 | Saito .................... | B62D 15/025 |
| | | | 701/122 |
| 2013/0060414 A1 * | 3/2013 | Lee ........................ | B62D 1/286 |
| | | | 701/23 |
| 2019/0263405 A1 * | 8/2019 | Schack .................. | B60W 30/18 |
| 2020/0047752 A1 * | 2/2020 | Ivanovic ............... | B60W 30/12 |
| 2020/0278684 A1 * | 9/2020 | Naserian ............... | G05D 1/0221 |
| 2020/0377089 A1 * | 12/2020 | Fukushige .......... | G01C 21/3602 |
| 2021/0402992 A1 * | 12/2021 | Morimoto .............. | G06V 10/82 |

* cited by examiner

Primary Examiner — Jaime Figueroa
Assistant Examiner — Jerrod Irvin Davis
(74) Attorney, Agent, or Firm — Fox Rothschild LLP

(57) ABSTRACT

An autonomous controller for lateral motion includes a vehicle positioning module that calculates a lateral departure degree from the center of a virtual line after a line is lost using position information of a vehicle. The position information is derived by data obtained from the vehicle which is traveling. The controller also includes a driving route determination module that determines the virtual line connecting waypoints previously generated on a map for a section where the line is lost to connect an old line with a new line. A lateral control module then performs lateral autonomous control of the vehicle in a direction where the lateral departure degree is minimized to cause the vehicle to follow a driving route connecting waypoints set on the virtual line to travel.

20 Claims, 16 Drawing Sheets

AUTONOMOUS CONTROLLER FOR LATERAL MOTION AND CONTROL METHOD THEREFOR

CROSS-REFERENCE TO RELATED APPLICATION

This application claims the benefit of priority to Korean Patent Application No. 10-2020-0152118, filed on Nov. 13, 2020, the entire contents of which are incorporated herein by reference.

TECHNICAL FIELD

The present disclosure relates to an autonomous controller for controlling lateral motion of a vehicle on a temporary lane lost road and a control method therefor.

BACKGROUND

Recently, there has been an increase in the use of a lane keeping assist system (LKAS) capable of preventing the vehicle which is traveling from departing from the line. Such an LKAS recognizes a line displayed on the road surface where the vehicle is currently traveling using a camera module and performs lateral control for automatically steering the steering wheel of the vehicle to prevent the departure of the line by using the line information as a reference value.

Although there is no line displayed on the road surface, when there is a vehicle which is traveling immediately in front of the host vehicle, the LKAS may perform lateral control for following the preceding vehicle by using a driving route of the preceding vehicle as a reference value. However, because it is impossible for such an existing LKAS to perform position estimation for a lateral movement degree of the vehicle for determining a lane departure degree of the vehicle which is traveling, in a situation where it is unable to obtain a suitable reference value, for example, when there is no line on the driving road surface or when there is no vehicle which is traveling in front, it is unable to execute suitable lateral control.

Accordingly, in the situation where it is unable to execute the lateral control, the existing LKAS releases a lateral control function and notifies the driver accordingly to guide the driver to perform manual driving. However, as the function is released when a section where the line is lost is relatively short, the existing LKAS depends on the manual driving of the driver. Thus, the driver is required to repeat the manual driving and the function activation of the LKAS.

SUMMARY

The present disclosure has been made to solve the above-mentioned problems occurring in the prior art while advantages achieved by the prior art are maintained intact. An aspect of the present disclosure provides an autonomous controller for lateral motion configured to calculate a lateral departure degree where the vehicle traveling on a temporal lane lost section is spaced apart from the center of a virtual line to estimate a lateral position of the vehicle within the virtual line and operate a steering device such that the estimated lateral position of the vehicle follows a driving route connecting waypoints set on the virtual line and a method therefor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous controller for lateral motion may include a vehicle positioning module configured to calculate a lateral departure degree from the center of a virtual line after a line is lost using position information of a vehicle, the position information being derived by data obtained from the vehicle which is traveling, a driving route determination module configured to determine the virtual line connecting waypoints previously generated on a map for a section where the line is lost to connect an old line with a new line as a driving route, and a lateral control module configured to perform lateral autonomous control of the vehicle in a direction where the lateral departure degree is minimized, such that the vehicle follows the driving route connecting waypoints set on the virtual line to travel.

Furthermore, according to an embodiment of the present disclosure, the vehicle positioning module may include an initial position setting device configured to set a position of the vehicle at a time immediately before the line is lost to an initial position for estimating a subsequent position change, a global position change rate deriving device configured to obtain a position information change rate of the vehicle on global coordinates from driving information obtained from the vehicle which travels on a lane lost section, and a vehicle positioning device configured to identify a position of the vehicle which travels on the virtual line by calculating vehicle movement information in a longitudinal direction and a lateral direction using the position information change rate of the vehicle and accumulate and store the vehicle movement information in the initial position to calculate the lateral departure degree of the vehicle on local coordinates.

In addition, the global position change rate deriving device may be configured to derive the position information change rate of the vehicle moving on the global coordinates using the driving information including a lateral acceleration of the vehicle, a yaw angle of the vehicle, a lateral slip angle of the vehicle, a front-wheel steering angle, and a rear-wheel steering angle obtained from the vehicle and specification information including a distance from the center of gravity of the vehicle to a front wheel axle and a distance from the center of gravity of the vehicle to a rear wheel axle.

The vehicle positioning device may be configured to integrate the position information change rate of the vehicle to calculate the movement information of the vehicle traveling in the longitudinal direction and the lateral direction and accumulate and store the movement information of the vehicle in the initial position to identify the lateral departure degree of the vehicle on the local coordinates. In addition, the driving route determination module may include a route setting device configured to determine whether there is a lane lost section capable of performing autonomous control of lateral motion as at least one waypoint is set in front of the road where the vehicle is traveling and sets the virtual line connecting the waypoints set for the lane lost section to the driving route for performing the autonomous control of the lateral motion.

Further, the lateral control module may include a steering controller configured to generate a control signal for controlling and operating a steering device of the vehicle such that the vehicle traveling on a lane lost section follows the driving route connecting the waypoints and transmit the control signal to a lateral torque controller of the vehicle. The steering controller may be configured to perform proportional integral derivation (PID) control of the steering device, such that the vehicle follows the driving route to travel, using a position error value of the vehicle, the position error value in which the vehicle traveling on the lane lost section is spaced apart from the driving route connecting the waypoints, and a distance between the current most adjacent waypoint and a waypoint subsequently located.

The autonomous controller may further include a display control module configured to display the virtual line set by the driving route determination module together with a road image indicating a road where the vehicle is traveling on a display module of the vehicle. The display control module may include a function activation display configured to display whether autonomous control of lateral motion is performed based on vehicle positioning on the display module and a line visualization display that displays the virtual line set for a lane lost section on the display module such that a driver visually recognize whether the driving route is valid.

According to another aspect of the present disclosure, an autonomous control method for lateral motion may include calculating a lateral departure degree from the center of a virtual line after a line is lost using position information of a vehicle, the position information being derived by data obtained from the vehicle which is traveling, determining the virtual line connecting waypoints previously generated on a map for a section where the line is lost to connect an old line with a new line as a driving route, and performing lateral autonomous control of the vehicle in a direction where the lateral departure degree is minimized, such that the vehicle follows the driving route connecting waypoints set on the virtual line to travel.

Furthermore, according to another embodiment of the present disclosure, the calculating of the lateral departure degree may include setting a position of the vehicle at a time immediately before the line is lost to an initial position for estimating a subsequent position change, obtaining a position information change rate of the vehicle on global coordinates from driving information obtained from the vehicle which travels on a lane lost section, and identifying a position of the vehicle traveling on the virtual line by calculating vehicle movement information in a longitudinal direction and a lateral direction using the position information change rate of the vehicle and accumulating and storing the vehicle movement information in the initial position to calculate the lateral departure degree of the vehicle on local coordinates.

The determining of the virtual line as the driving route may include setting a maximum distance of a lane lost section capable of performing autonomous control of lateral motion to a reference lost interval to perform the autonomous control of the lateral motion in only a temporary lane lost section and determining whether there is a lane lost section capable of performing the autonomous control of the lateral motion as at least one waypoint is set in front of a road where the vehicle is traveling and setting the virtual line connecting the waypoints set for the lane lost section to the driving route for performing the autonomous control of the lateral motion.

Additionally, the performing of the lateral autonomous control of the vehicle may include performing proportional integral derivation (PID) control of a steering device, such that the vehicle follows the driving route to travel, using a position error value of the vehicle, the position error value in which the vehicle traveling on a lane lost section is spaced apart from the driving route connecting the waypoints and a distance between the current most adjacent waypoint and a waypoint subsequently located.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
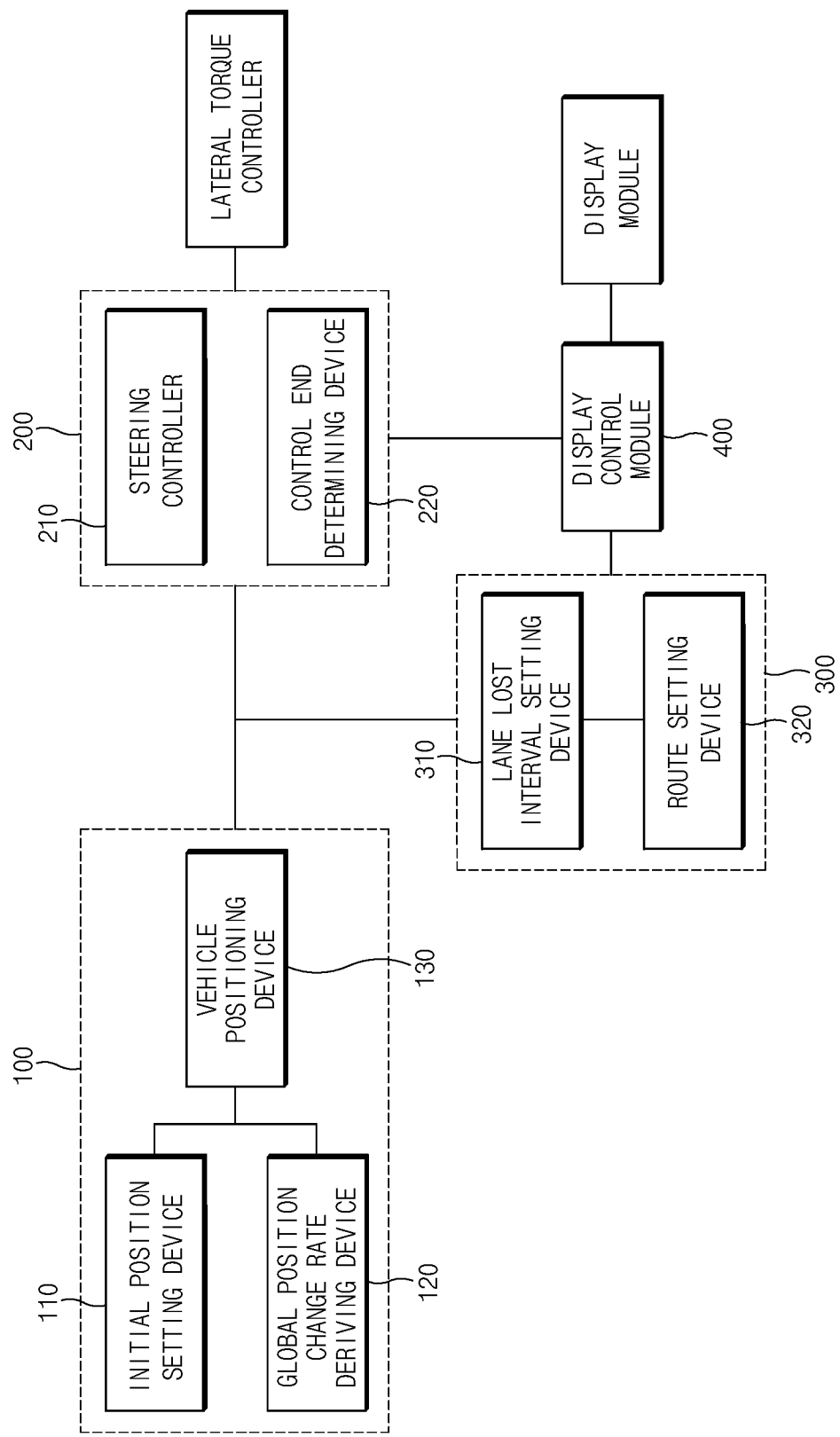
FIG. 1 is a block diagram illustrating a configuration of an autonomous controller for lateral motion according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

Figure 2:
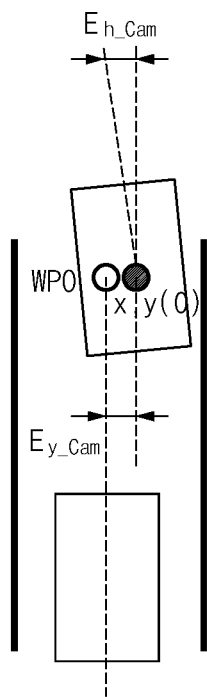
FIG. 2 is a drawing illustrating a dynamics model for positioning of a vehicle according to an embodiment of the present disclosure.
Figure 3:
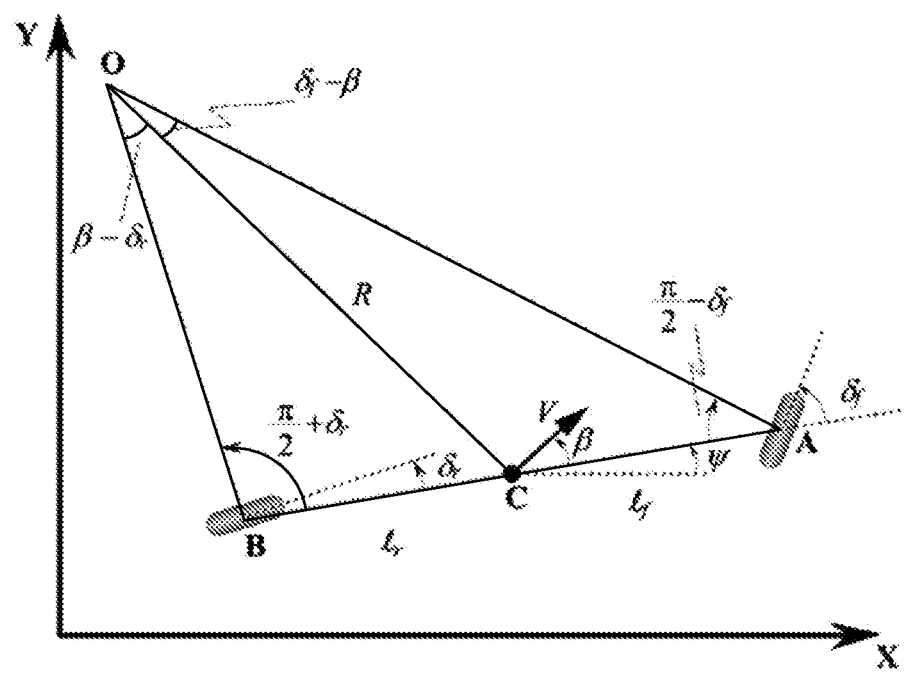
FIG. 3 is a drawing illustrating setting an initial position of a vehicle in a vehicle positioning module according to an embodiment of the present disclosure.
Figure 4A:
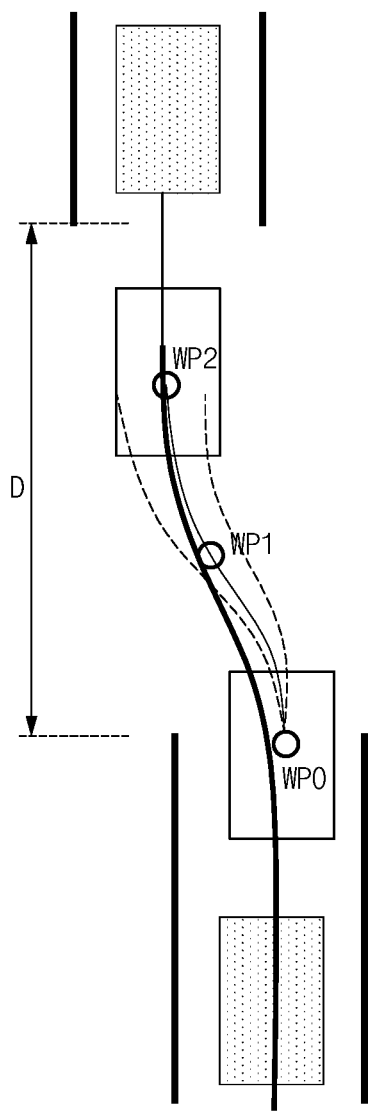
FIGS. 4A, 4B, and 4C are drawings illustrating calculating a lane lost interval for autonomous control of lateral motion according to an embodiment of the present disclosure.
Figure 4B:
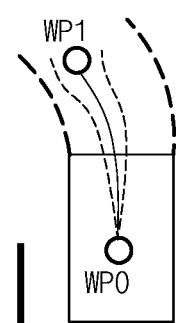
Figure 4C:
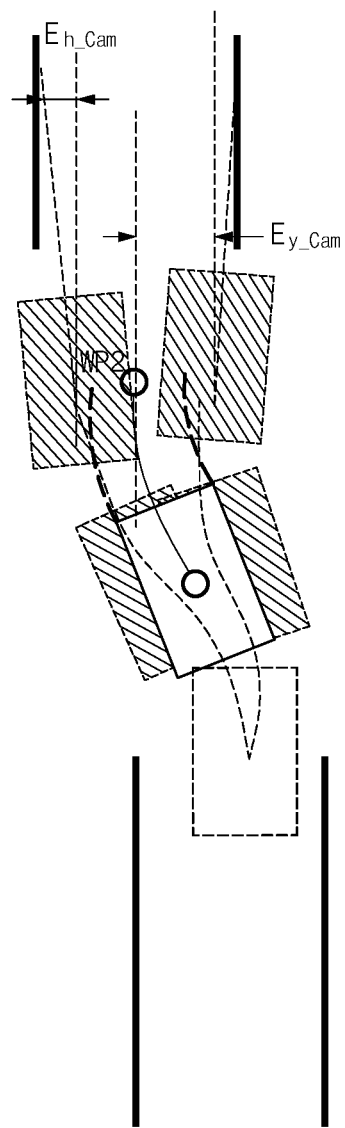
Figure 5:
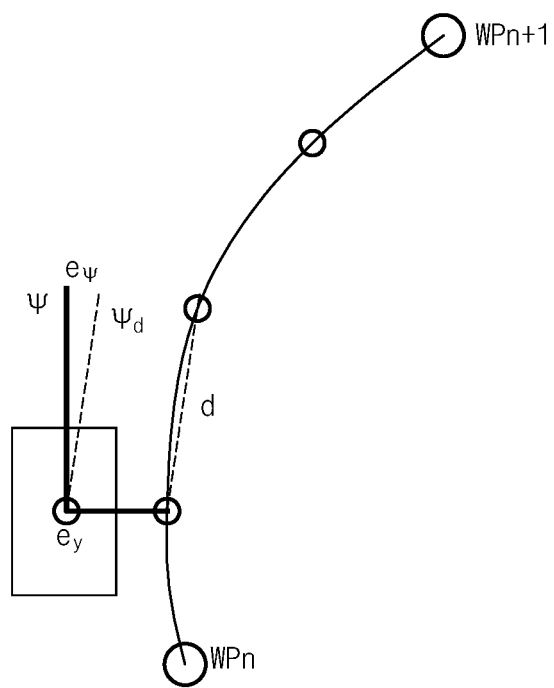
FIG. 5 is a drawing illustrating performing steering control according to an embodiment of the present disclosure.
Figure 6A:
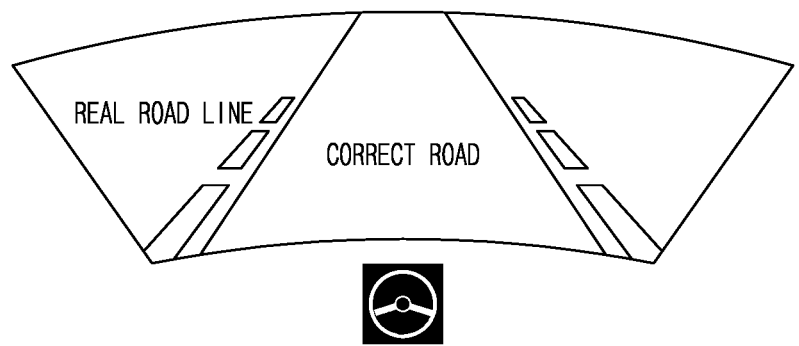
FIGS. 6A, 6B, and 6C are drawings illustrating that an example of autonomous control of lateral motion is displayed on a display module according to an embodiment of the present disclosure.
Figure 6B:
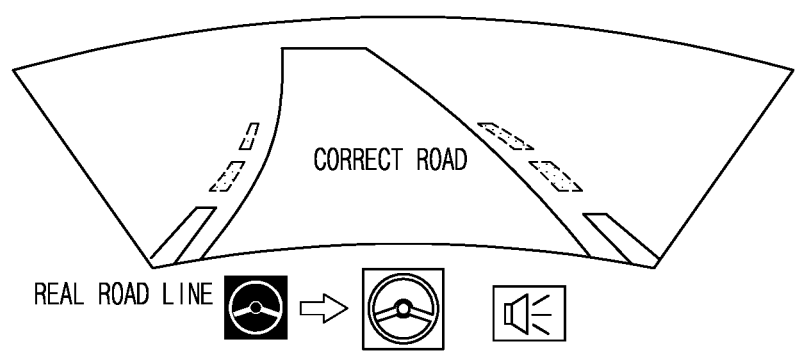
Figure 6C:
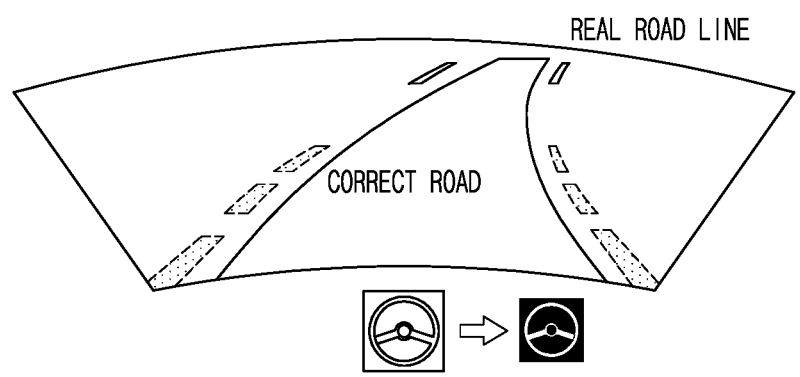
Figure 7A:
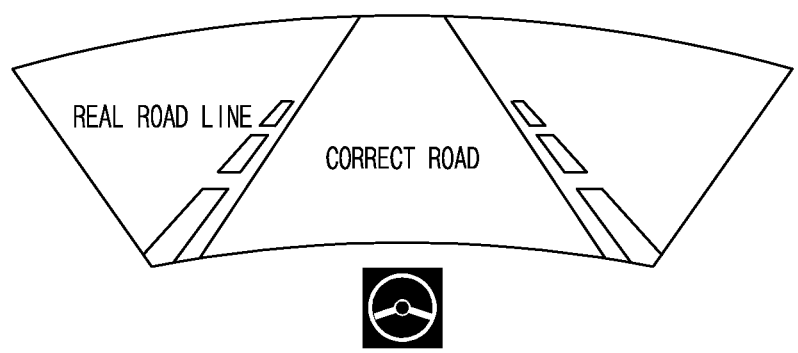
FIGS. 7A, 7B, and 7C are drawings illustrating that another example of autonomous control of lateral motion is displayed on a display module according to an embodiment of the present disclosure.
Figure 7B:
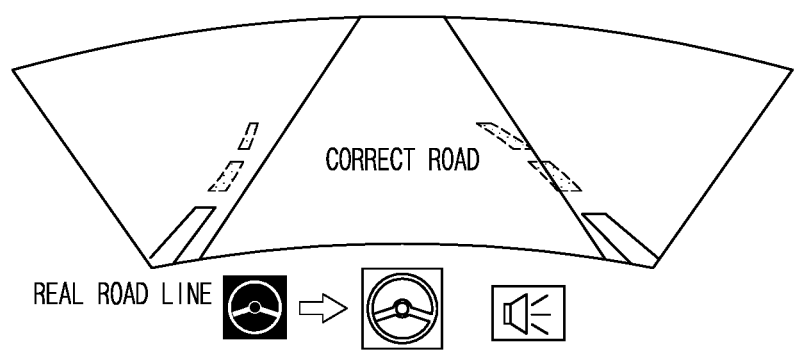
Figure 7C:
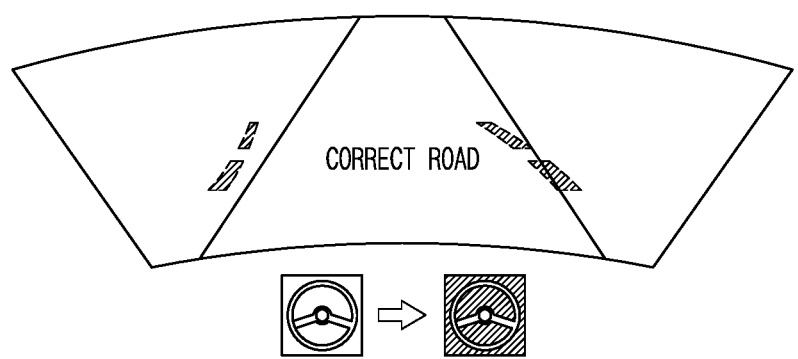

FIG. 1 is a block diagram illustrating a configuration of an autonomous controller for lateral motion according to an embodiment of the present disclosure. FIG. 2 is a drawing illustrating a dynamics model for positioning of a vehicle according to an embodiment of the present disclosure. FIG. 3 is a drawing illustrating setting an initial position of a vehicle in a vehicle positioning module according to an embodiment of the present disclosure. FIG. 4A to 4C are drawings illustrating calculating a lane lost interval for autonomous control of lateral motion according to an embodiment of the present disclosure. FIG. 5 is a drawing illustrating performing steering control according to an embodiment of the present disclosure. FIGS. 6A to 6C are drawings illustrating that an example of autonomous control of lateral motion is displayed on a display module according to an embodiment of the present disclosure. FIGS. 7A to 7C are drawings illustrating that another example of autonomous control of lateral motion is displayed on a display module according to an embodiment of the present disclosure.

Referring to FIG. 1, the autonomous controller for the lateral motion according to an embodiment of the present disclosure may include a vehicle positioning module 100 configured to calculate a lateral departure degree from the center of a virtual line after the lane is lost using position information of a vehicle, which is derived by data obtained from the vehicle which is traveling, and a lateral control module 200 configured to perform lateral autonomous control of the vehicle in a direction where the lateral departure degree is minimized to cause the vehicle to follow a driving route connecting waypoints set on the virtual line to travel.

When there is no reference value for performing lateral control, for example, when the line is lost and there is no preceding vehicle in front of the subject or host vehicle, the vehicle positioning module 100 may be configured to calculate position information of the vehicle, which is able to determine whether the vehicle which is traveling moves to any degree in a lateral direction. In other words, as the vehicle passes through a section where the line is temporarily lost, since the vehicle meets or reaches a new line to travel, lateral motion of the vehicle passing through the temporal lane lost section may be performed within a virtual line range connecting an old line which is present before the lane lost section with a new line subsequently shown. When the vehicle departs from such a virtual line range, this interferes with the progress of a vehicle which is traveling on a surrounding line.

Thus, the vehicle positioning module 100 may be configured to localize the vehicle using a dead reckoning scheme to estimate the lateral departure degree from the center of the virtual line to determine whether motion of the vehicle which travels on the lane lost section is maintained within the virtual line range or departs from the range. Accordingly, the vehicle positioning module 100 may include an initial position setting device 110 configured to set a position of the vehicle at a time immediately before the line is lost to an initial position for estimating a subsequent position change, a global position change rate deriving device 120 configured to obtain a position information change rate of the vehicle on global coordinates from driving information obtained from the vehicle which travels on the lane lost section, and a vehicle positioning device 130 configured to calculate vehicle movement information in a longitudinal direction and a lateral direction using the position information change rate of the vehicle and accumulate and store the vehicle movement information in the initial position to calculate the lateral departure degree of the vehicle on local coordinates, and identify the position of the vehicle which travels on the virtual line.

The vehicle positioning module 100 may be configured to add lateral motion on global coordinates (which are displayed in English capital letters X and Y) derived based on data, such as a yaw angel and a lateral slip angle obtained or estimated from various sensors provided in the vehicle, and vehicle specification information to an initial position (x(0), y(0)) on local coordinates (which are displayed in English lowercase letters x and y) with respect to the vehicle, thus determining whether the vehicle moves to any degree in the lateral direction in a situation where the line is lost and an explicit reference value is not obtained.

In particular, the initial position setting device 110 may be configured to set a lateral error value immediately before a reference value for lateral control is not obtained using a camera module or the like to a y-axis initial value y(0) on the local coordinate system and may set the fixed value "0" to an x-axis initial value x(0), thus setting them to an initial position on the local coordinates for localizing the vehicle using the dead reckoning. In other words, the vehicle positioning module 100 may be configured to identify whether the position where the vehicle which is traveling without a reference value for lateral control moves in the lateral direction departs from the center of the virtual line to any degree. Thus, the center of the virtual line extended from an old line which is present before the lane lost section to a new line may be set a reference point (y=0) for determining a lateral departure degree. The lateral position information of the vehicle, which is identified by the vehicle positioning module 100, may be a lateral error value where the vehicle departs from the reference point to the left or the right.

As shown in FIG. 2, the initial position setting device 110 may be configured to set a degree $E_{y\_Cam}$ to which the central position of the vehicle, which is obtained by the camera module by using the line as a reference value before the line is lost, departs from the center of the line to y(0). Thus, the initial position (x(0), y(0)) may be set to (0, $E_{y\_Cam}$). In particular, in FIG. 2, the center of the virtual line is represented as a waypoint WP0, and a value of the lateral direction where the vehicle travels is represented as $E_{h\_Cam}$.

Furthermore, the global position change rate deriving device 120 may be configured to derive the position information change rate of the vehicle in real time using a vehicle dynamics model shown in FIG. 3 based on driving information obtained from the vehicle and vehicle specification information. Accordingly, the global position change rate deriving device 120 may be configured to derive the position information change rate of the vehicle moving on the global coordinates using calculation such as Equation 1 below, using driving information, such as a longitudinal acceleration V of the vehicle, a yaw angle ψ of the vehicle, a lateral slip angle β of the vehicle, a front-wheel steering angle $δ_f$, and a rear-wheel steering angle $δ_r$, which are obtained from the vehicle, a distance $l_f$ from the center of gravity (denoted as C in FIG. 3) of the vehicle to a front wheel axle (denoted as A in FIG. 3), and a distance $l_r$ from the center of gravity (denoted as C in FIG. 3) of the vehicle to a rear wheel axle (denoted as B in FIG. 3).

$$\dot{X} = V\cos(\psi + \beta)$$

$$\dot{Y} = V\sin(\psi + \beta)$$

$$\dot{\psi} = \frac{V\cos\beta}{l_f + l_r}(\tan\delta_f - \tan\delta_r)$$

$$\beta = \tan^{-1}\frac{l_f\tan\delta_r + l_r\tan\delta_r}{l_f + l_r}$$

Equation 1

In Equation 1 above, $\dot{X}$ indicates the position information change rate of the vehicle in the longitudinal direction on the global coordinates, and $\dot{Y}$ indicates the position information change rate of the vehicle in the lateral direction on the global coordinates.

The vehicle positioning device 130 may be configured to integrate the position information change rate of the vehicle to calculate movement information of the vehicle moving in the longitudinal direction and the lateral direction and may accumulate and store the calculated movement information of the vehicle in the initial position (x(0), y(0)) "(0, $E_{y\_Cam}$)" to identify the lateral departure degree of the vehicle on the local coordinates. Thus, the vehicle positioning device 130 may be configured to calculate the lateral departure degree indicating whether the vehicle departs to any degree in the lateral direction on the local coordinates of the vehicle, which uses the center of the virtual line as a lateral reference point, using calculation such as Equation 2 below, thus identifying a position of the vehicle.

$$(x,y)=(\int\dot{X}, E_{y\_Cam}+\int\dot{Y})$$

Equation 2

Since the position information change rate of the vehicle which travels on the road is represented in the same manner on the global coordinates and the local coordinates, the vehicle positioning device 130 may be configured to apply the position information change rate of the vehicle, which is obtained on the global coordinates, to an initial position on the local coordinates of the vehicle, which is with respect to the center of the virtual line, thus calculating the lateral departure degree of the vehicle in the lane lost section where it is unable to obtain a reference value such as the line using the camera module.

Furthermore, the autonomous controller for the lateral motion according to an embodiment of the present disclosure may further include a driving route determination module 300 configured to determine the virtual line connecting waypoints WP previously generated on a map for a section where the line is lost to connect an old line with a new line as the driving route. Accordingly, to perform autonomous control to limit driving on the section where the line is lost, particularly, lateral movement to an area within a certain virtual line range, the driving route determination module 300 may be configured to preset at least one waypoint WP in the section where the line is lost on the map which provides the driving route. Such waypoints WP may be set to values of global coordinates (X,Y) and may be set to a plurality of points having intervals which are spaced apart from each other to start from a final portion of the old line to the new line.

FIGS. 4A to 4C illustrate WP0, WP1, and WP2 as an example of waypoints. FIG. 5 illustrates that a plurality of waypoints are included on a line from $WP_n$ to $WP_{n+1}$. The interval and the number of such waypoints may be set in various manners according to a lateral separation degree between the old line and the new line as well as a distance of the lane lost section.

The waypoints WP may be used to set lateral coordinates to be located on the center of the virtual line connecting the center of an old line with the center of a new line to identify the lateral departure degree derived by the vehicle positioning module 100 when the vehicle is traveling on the lane lost section as a lateral error value at each waypoint. The driving route determination module 300 may include a route setting device 320 configured to determine whether there is a lane lost section capable of performing autonomous control of lateral motion as at least one waypoint WP is set in front of the road where the vehicle is traveling and setting the virtual line connecting the waypoints set for the lane lost section to the driving route for performing the autonomous control of the lateral motion.

Particularly, the route setting device 320 may be configured to determine a trajectory connecting the waypoints as a curvature $(K(s)=a+bs+cs^2+...)$ determined in the form of a high-order polynomial according to a distance s where the vehicle should travels, in the same manner as usually generating a route. However, because an embodiment of the present disclosure facilitates navigation driving by positioning of the vehicle on the generated driving route, rather than generating a route where the vehicle travels on the lane lost section, a detailed description for generating a route will be omitted. The route setting device 320 may be configured to determine whether there is a risk that a function will be released in the lane lost section, since a line-based lateral driving assistance function is operating before setting the driving route to proactively determine whether autonomous control of lateral motion is required and may be configured to set a driving route on the lane lost section.

In particular, seeing a relationship between a first waypoint WP0 the vehicle first faces in the lane lost section and the initial position (x(0), y(0)) of the vehicle set by the vehicle positioning module 100, since a value of an x-axis direction which is the longitudinal direction is set from the beginning of the lane lost section, it may be set in the same manner as a value of x(0) at WP0. Since a value of a y-axis direction which is the lateral direction refers to a distance difference spaced apart from WP0 which is the center of a virtual line connected with an old line, as shown in FIG. 2, a value of y(0) which is the initial position may be a lateral distance difference $E_{y\_Cam}$ with the first waypoint WP0.

Furthermore, the driving route determination module 300 may further include a lane lost interval setting device 310 configured to set a maximum distance of the lane lost section capable of performing autonomous control of lateral motion to a reference lost interval to perform the autonomous control of the lateral motion in only a temporary lane lost section. When the vehicle is traveling through the plurality of waypoints WP along the driving route set by the driving route determination module 300, a cumulative error for the lateral position of the vehicle estimated by the vehicle positioning module 100 may be increased as shown in FIG. 4C. In FIG. 4C, as the lane lost section is increased, an interval between dotted lines indicating the driving route of the vehicle which travels from WP0 to WP2 through WP1 is increasingly spaced, and an increase in cumulative error is represented.

Thus, there is a need to limit a lane lost interval D which is a distance of the lane lost section to perform navigation driving by autonomous control of lateral motion to prevent the vehicle which performs the autonomous control of the lateral motion in the lane lost section from departing from its line and breaking into a neighboring lane. Accordingly, the driving route determination module 300 may be configured to set the driving route to execute the autonomous control of the lateral motion only when meeting when the speed V of the vehicle is less than or equal to a certain reference speed $V_{x\_Thd}$ and when the lane lost interval D is less than or equal to a reference lost interval $D_{is\_Thd}$. In other words, when the speed of the vehicle is fast (e.g., greater than a predetermined speed threshold), the lateral departure degree may be sharply increased within a short moment. Autonomous control of lateral motion may be performed only when the speed of the vehicle is less than or equal to the reference speed $V_{x\_Thd}$, to prevent a collision with another vehicle which is traveling on an adjacent line.

The lane lost interval setting device 310 may be configured to set a distance meeting when a lateral error value $E_{y\_Cam}$ accumulated while the vehicle travels the lane lost section is less than or equal to a reference lateral error (Lat_Thd) value set based on the center of the line and when a heading error value $E_{h\_Cam}$ indicating a degree to which the vehicle is misaligned from the line is less than or equal to a predetermined reference heading error (Head_Thd) value to the reference lost interval $D_{ist\_Thd}$. An area having maximum values of the reference lateral error Lat_Thd and the reference heading error Head_Thd is shown in FIG. 4C. In particular, as shown in FIG. 4C, the lateral error value $E_{y\_Cam}$ may be defined as a distance between the center of anew line and the center of the vehicle, and the heading error value $E_{h\_cam}$ may be defined as a difference between a progress direction of the new line and a direction the center of the vehicle faces.

FIG. 4A illustrates connecting the center of a virtual line connecting waypoints WP0, WP1, and WP2 set in the lane lost section using a thick solid line and providing a driving route and illustrates an increase in lateral error value or heading error value of the vehicle while the vehicle reaches WP2 from WP0 through WP1 using a dotted line getting wider and wider from an old line to a new line. The route where the vehicle travels is represented as a thin solid line.

As shown in FIG. 4C, the represented dotted line indicates a boundary between the maximum value of the lateral error value and the maximum value of the heading error value the vehicle which is traveling on the lane lost section may have. Thus, it is shown that the vehicle, when the vehicle will travel along such a boundary, is represented in the form of slashes and the lateral error value at WP2 is represented to be larger than that at WP1. When displaying the heading error value $E_{h\_Cam}$ together when the vehicle is located on a position corresponding to the maximum value of the lateral error value at WP2, it may verified that there is a high probability that the vehicle will depart from the line after entering a new line when the vehicle is located on the position corresponding to the maximum value of the lateral error value at WP2. Thus, it may be verified that the lane lost section should be set to be less than that shown.

A maximum value of a reference lateral error value for the lateral error value and a maximum value of a reference heading error value for the heading error value may be set to more accurate values using data experientially obtained by real driving of the vehicle. Furthermore, the lateral control module 200 may include a steering controller 210 configured to generate a control signal for operating a steering device of the vehicle and transmit the control signal to a lateral torque controller of the vehicle to cause the vehicle which is traveling on the lane lost section to follow the driving route connecting the waypoints set by the driving route determination module 300.

The steering controller 210 may be configured to perform proportional integral derivation (PID) control of the steering device such that the vehicle follows the driving route to travel using a position error value S of the vehicle, in which the vehicle which is traveling on the lane lost section is spaced apart from the driving route connecting the waypoints, and a distance d between the current most adjacent waypoint and a waypoint subsequently located. Accordingly, as shown in FIG. 5, the steering controller 210 may be configured to calculate a lateral distance from a waypoint set in the nearest place from the current position of the vehicle among waypoints located on the driving route connecting $WP_n$ with $WP_{n+1}$. The lateral distance refers to a lateral error $e_y$ of the vehicle, which is calculated from the driving route.

The steering controller 210 may be configured to set a yaw formed by a straight line connecting a waypoint calculated by the lateral distance $e_y$ with a subsequent waypoint to a desired yaw $\Psi_d$ which is a target value the vehicle should follow on the driving route and may be configured to calculate a difference between a steering yaw ψ of a direction the vehicle currently faces and the desired yaw $\Psi_d$ as a heading error $e_\psi$. Thus, the steering controller 210 may be configured to calculate a position error value S of the vehicle spaced apart from the driving route using a relationship equation, such as Equation 3 below, between the lateral direction $e_y$ and the heading error $e_\psi$.

$$S = e_y + de_\psi$$

$$S = e_y + d(\psi - \psi_d) \qquad \text{Equation 3}$$

In particular, the steering yaw ψ of the direction the vehicle faces may be obtained from a yaw rate sensor or the like provided in the vehicle, and the distance d between two waypoints may be set to a function (d=f(v)) according to the speed of the vehicle. The desired yaw $\Psi_d$ between the two waypoints may be calculated using setting positions of predetermined waypoints.

As described above, the steering controller 210 may be configured to calculate the position error value S of the vehicle which travels on the lane lost section and perform autonomous control of lateral motion such that steering yaw is adjusted in the direction where it is able to minimize the position error value S.

The lateral control module 200 may further include a control end determining device 220 configured to determine whether a situation to end the autonomous control of the lateral motion which is being executed in the lane lost section by the steering controller 210 occurs. In particular, the control end determining device 220 may be configured to stop generating the control signal at the steering controller 210 for the autonomous control of the lateral motion in response to receiving a steering torque input from a driver to execute manual driving and may be configured to notify the driver that the autonomous control of the lateral motion is ended.

Furthermore, the control end determining device 220 may be configured to determine whether the vehicle arrives at a position within a certain distance from the final waypoint on the driving route. When the vehicle enters the position within the certain distance and when the line is recognized, the control end determining device 220 may be configured to stop positioning by the vehicle positioning module 100 and the autonomous control of the lateral motion according to the positioning and may be configured to execute a camera-based lateral control mode.

When the line is not recognized after the vehicle enters the position within the certain distance from the final waypoint, the control end determining device 220 may be configured to determine whether a distance where the vehicle travels on the lane lost section is greater than a predetermined maximum navigation driving distance. When the distance where the vehicle travels on the lane lost section is greater than the predetermined maximum navigation driving distance, the control end determining device 220 may be configured to stop the autonomous control of the lateral motion to execute manual driving and may be configured to notify the driver that the autonomous control of the lateral motion is ended. In particular, the maximum navigation driving distance may be set to a distance to the point that a lateral error value of the line does not break into another adjacent line based on the lane lost interval set by the driving route determination module 300.

The autonomous controller for the lateral motion according to an embodiment of the present disclosure may further include a display control module 400 configured to display the virtual line set by the driving route determination module 300 together with a road image indicating the road where the vehicle is traveling on a display module of the vehicle. In particular, the display module may include various display devices, such as a head up display (HUD), a cluster for vehicle, or a navigation provided in the vehicle, which display a line where the vehicle is traveling and a virtual line to be visually recognized by the driver. The display module may be a display in which various augmented reality concepts are reflected to improve cognitive convenience of the driver.

The display control module 400 may include a function activation display configured to display whether autonomous control of lateral motion is performed based on vehicle positioning in the lane lost section according to an embodiment of the present disclosure and a lane visualization display configured to display a virtual line set for the lane lost section on the display module such that the driver visually recognizes whether the virtual line is valid. Thus, as shown in FIG. 6A, the display control module 400 may be configured to display real road lines obtained from the camera module or the like on the display module such that the driver recognizes a space between the rear road lines as a driving space of the vehicle (which is displayed as a 'correct road' in FIGS. 6A to 6C and FIGS. 7A to 7C) to intuitively identify a lateral movement degree or a lane departure degree of the vehicle.

Thereafter, when the vehicle enters the lane lost section, as shown in FIGS. 6B and 6C, the display control module 400 may be configured to display a virtual line connecting an old line with a new line before and after the lane lost section on the display module, such that the driver may intuitively recognize whether a driving route formed by the virtual line effectively guides an area where the vehicle should travel on the lane lost section.

In FIGS. 6A to 6C, the real road line is displayed as a solid line and the virtual line is displayed as a dotted line, such that it is possible to distinguish a lane lost section. In FIGS. 6B and 6C, it is visually verified that the virtual line forms a driving route bent to the left or the right along the correct road on which the vehicle should travel, such that the driver simply verifies whether the driving route is appropriate by such a display module.

In particular, it is represented that lateral control of the vehicle is performed by a usual lateral driving assistance function performed based on a lane image obtained by the camera by displaying a steering wheel on a black background square. The lateral autonomous control function performed based on navigation driving by the vehicle positioning module 100 according to an embodiment of the present disclosure is represented by displaying a steering wheel on a white background square, such that it is represented that the driver may intuitively recognize whether a function switches by only conversion of an icon displayed on the display module. Furthermore, in FIG. 6B, as a speaker indication is represented together, it is represented to allow the driver to recognize whether the function switches in the form of a caution and a waning sound by a voice or other sound.

Thereafter, as shown in FIG. 6C, as the real road line is shown again, when the line is recognized by the camera module, the driver may recognize that usual lateral control is performed as a camera-based lateral driving assistance function is executed again by a change in an icon indicating function switching. Furthermore, to help determine whether to execute manual steering when the driving route selected by the driving route determination module 300 is not appropriate for a road situation where the vehicle is actually traveling, as shown in FIGS. 7A to 7C, the display control module 400 may be configured to display it such that the driver may intuitively recognize it.

In other words, as the vehicle which is traveling on a section with a real road line shown in FIG. 7A along a correct road enters a lane lost section shown in FIG. 7B, when the driving route composed of a virtual line (displayed with a dotted line in FIG. 7B) is selected by the driving route determination module 300, such a virtual line may be displayed on the display module. Accordingly, since the driving route composed of the virtual line is previously displayed on the display module, the driver may intuitively determine that the virtual line is not identical to the correct road capable of being visually identified by the driver. As such, the driver who recognizes that the driving route selected to drive the lane lost section is not appropriate because the driving route composed of the virtual line is not identical to the correct road may quickly determine whether to end the lateral autonomous control and perform manual driving.

Particularly, when there is steering wheel control by the manipulation of the steering device of the driver or control of an acceleration and deceleration device, the lateral autonomous control following the driving route based on the virtual line may be released. The display control module 400 may be configured to remove the virtual line and display a function release situation for driving by changing an icon to notify the user of the function release situation. As an icon in which the steering wheel is displayed on a white background square is changed and displayed to an icon in which the steering wheel is displayed on a square, the inside of which is filled with slashes, it is represented in FIG. 7C that the driver may intuitively recognize that the function switches.

Figure 8:
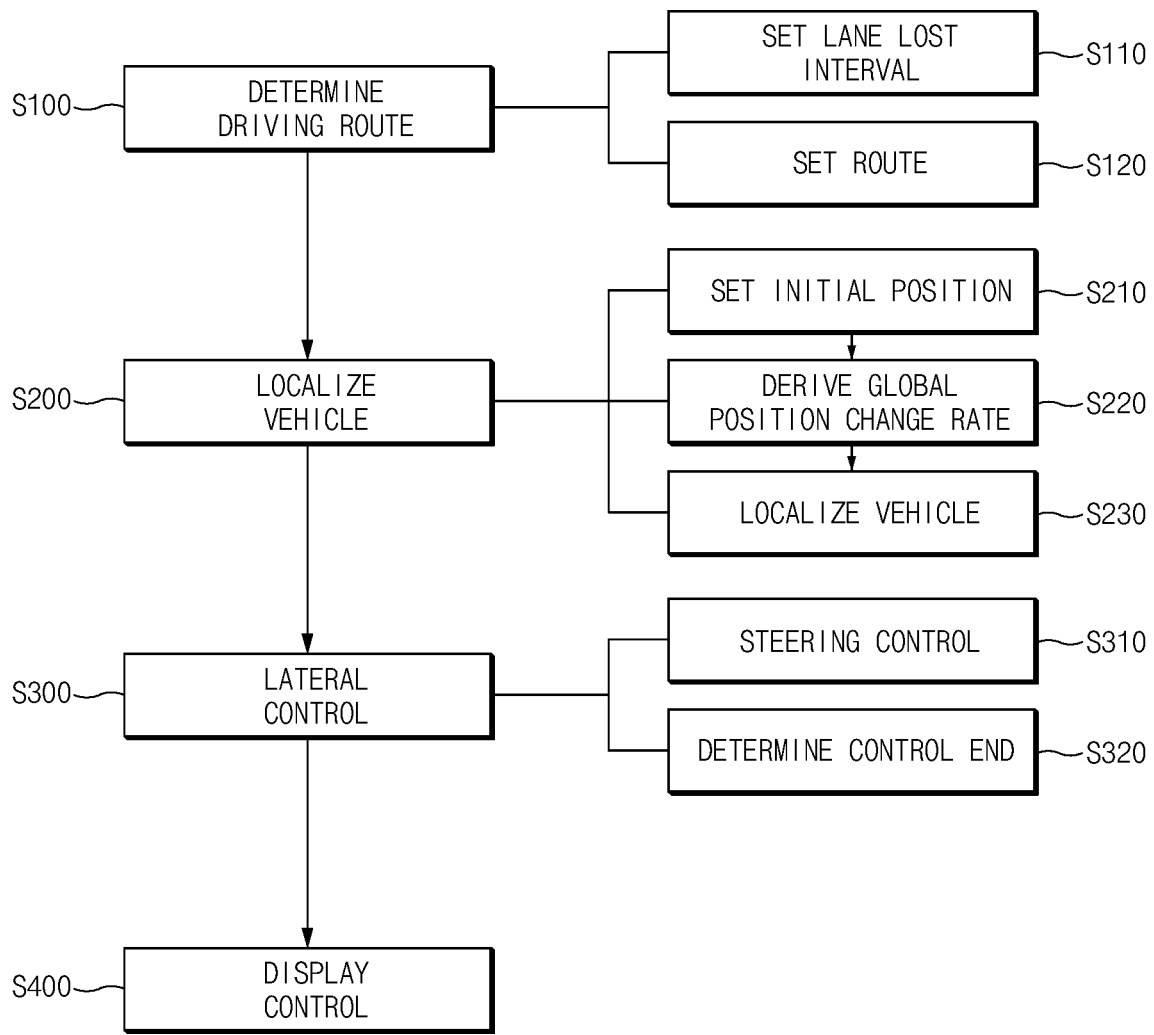
FIG. 8 is a drawing illustrating an autonomous control method for lateral motion according to another embodiment of the present disclosure.
Figure 9:
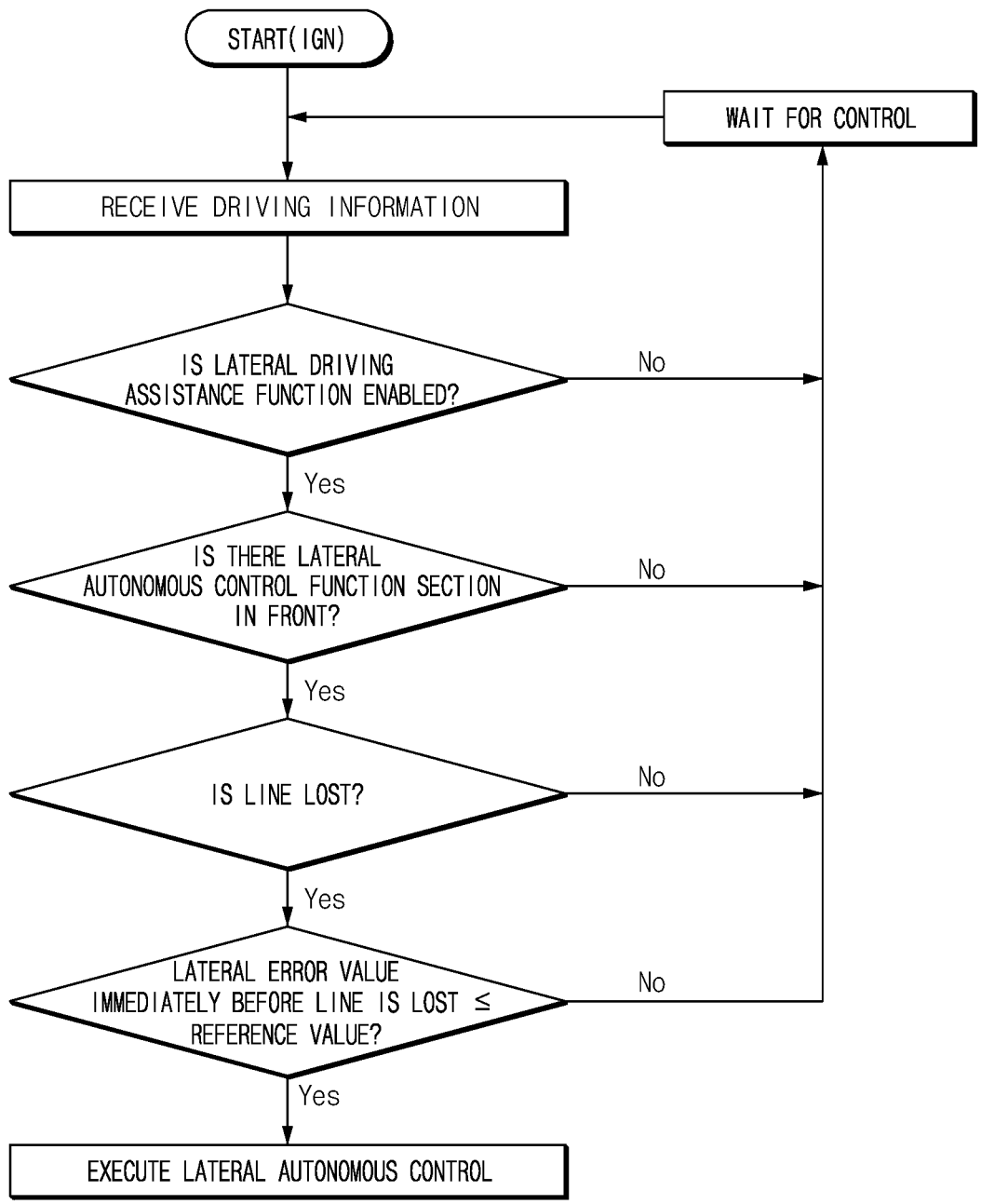
FIG. 9 is a flowchart illustrating a process of determining whether autonomous control of lateral motion is executed according to another embodiment of the present disclosure.
Figure 10:
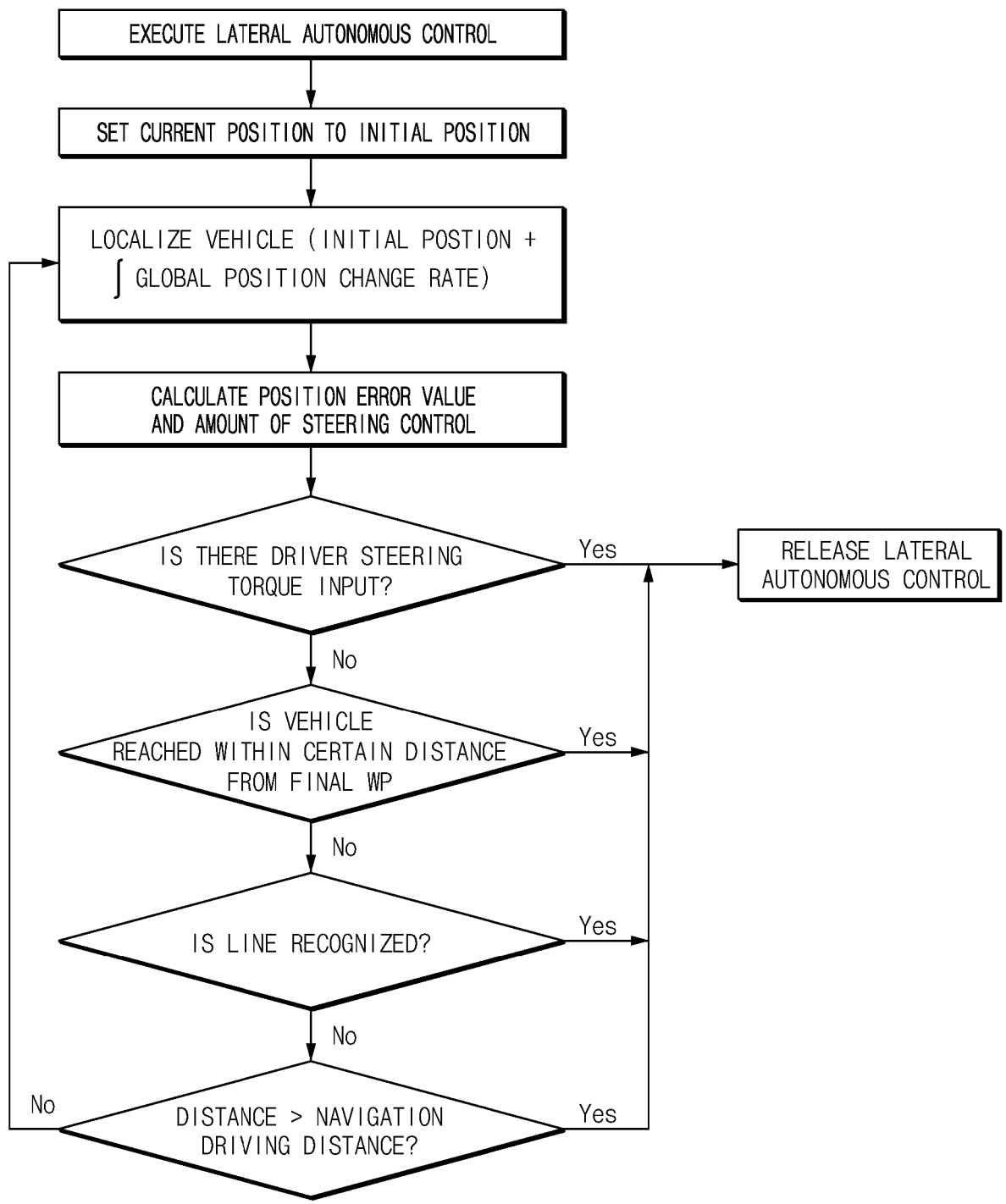
FIG. 10 is a flowchart illustrating a process of executing autonomous control of lateral motion according to another embodiment of the present disclosure.

Next, a description will be given of an autonomous control method for lateral motion according to another embodiment of the present disclosure with reference to FIGS. 8 and 10. FIG. 8 is a drawing illustrating an autonomous control method for lateral motion according to another embodiment of the present disclosure. FIG. 9 is a flowchart illustrating a process of determining whether autonomous control of lateral motion is executed according to another embodiment of the present disclosure. FIG. 10 is a flowchart illustrating a process of executing autonomous control of lateral motion according to another embodiment of the present disclosure. The method described herein below may be executed by a controller.

Referring to FIG. 8, the autonomous control method for the lateral motion according to anther embodiment of the present disclosure may include calculating (S200) a lateral departure degree from the center of a virtual line after the lane is lost using position information of a vehicle, which is derived by data obtained from the vehicle which is traveling, and performing (S300) lateral autonomous control of the vehicle in a direction where the lateral departure degree is minimized such that the vehicle follows a driving route connecting waypoints set on the virtual line to travel.

The autonomous control method for the lateral motion according to another embodiment of the present disclosure may be to allow the vehicle to travel on the lane lost section while controlled not to depart from a virtual line range connecting an old line with a new line although the line is temporarily lost and enter the new line without line departure after passing through the lane lost section. In particular, S200 may include estimating the lateral departure degree of the vehicle from the center of the virtual line using a dead reckoning scheme and localizing the vehicle to determine whether motion of the vehicle which travels on the lane lost section is maintained within the virtual line range or departs from the range.

Accordingly, S200 may include setting (S210) a position of the vehicle at a time immediately before the line is lost to an initial position for estimating a subsequent position change, obtaining (S220) a position information change rate of the vehicle on global coordinates from driving information obtained from the vehicle which travels on the lane lost section, and calculating (S230) vehicle movement information in a longitudinal direction and a lateral direction using the position information change rate of the vehicle, accumulating and storing the vehicle movement information in the initial position to calculate the lateral departure degree of the vehicle on local coordinates, and identifying the position of the vehicle which travels on the virtual line.

Additionally, S200 may include accumulating and storing the position change rate on the global coordinates of the vehicle in the initial position on a local coordinate system and identify the lateral departure degree indicating whether the vehicle moves to any degree in the lateral direction from the center of the virtual line. In particular, S210 may include setting a lateral error value $E_{y\_Cam}$ immediately before a lane lost time when a reference value for lateral control is not obtained using a camera module or the like to a y-axis initial value on the local coordinate system and setting the fixed value "0" to an x-axis initial value, thus setting the initial position indicating the position of the vehicle on the local coordinates. In particular, when the center of the virtual line is set to a reference point (y=0), the lateral error value may be defined as a separation distance from the center of the virtual line.

Further, S220 may include deriving the position information change rate of the vehicle which travels on the global coordinates using a vehicle dynamics model based on driving information of the vehicle, which is obtained from the vehicle which is traveling, and vehicle specification information. In addition, S230 may include integrating the position information change rate of the vehicle to calculate the movement information of the vehicle which travels in the longitudinal direction and lateral direction and accumulating and storing the movement information of the vehicle in the initial position to localize the vehicle on the local coordinates. Thus, the lateral departure degree of the vehicle from the center of the virtual line may be identified. Since the lateral departure degree is a lateral error value where the virtual line to be followed in S300 departs from a waypoint set on the center of the virtual line, it may be used as data for generating a control signal for operating a steering device to minimize such a lateral error value.

The autonomous control method for the lateral motion according to another embodiment of the present disclosure may further include determining (S100) the virtual line connecting waypoints WP previously generated on a map for a lane lost section to connect an old line with a new line as the driving route. In particular, S100 may include determining (S120) whether there is a lane lost section where at least one waypoint WP is set in front of the road where the vehicle is traveling and setting the virtual line connecting the waypoints set for the lane lost section to the driving route for performing the autonomous control of the lateral motion.

As shown in FIG. 9, S120 may include determining whether there is a risk that a function will be released in the lane lost section because a line-based lateral driving assistance function is operating before setting the driving route to proactively determine whether autonomous control of lateral motion is required and set the driving route on the lane lost section. Furthermore, S100 may further include setting (S110) a maximum distance of the lane lost section capable of performing autonomous control of lateral motion to a reference lost interval to perform the autonomous control of the lateral motion in only a temporary lane lost section.

The longer the distance where the vehicle travels depending on only navigation driving in the state there is no reference value such as the lane image, the more the accumulated lateral error may increase. Thus, to prevent the vehicle from breaking into a line adjacent to the virtual line or the new line due to the accumulated lateral error, there is a need to limit a lane lost interval D to perform navigation driving to a certain reference lost interval $D_{ist\_Thd}$ or less.

Accordingly, S110 may include setting a distance meeting when a lateral error value $E_{y\_Cam}$ accumulated while the vehicle travels on the lane lost section is less than or equal to a reference lateral error (Lat_Thd) value set based on the center of the new line and when a heading error value $E_{h\_cam}$ indicating a degree to which the vehicle is misalign from the new line is less than or equal to a predetermined reference heading error (Head_Thd) value to the reference lost interval $D_{ist\_Thd}$. Thus, as shown in FIG. 9, in determining whether there is a section capable of performing lateral autonomous control in front, S120 may include comparing the lane lost interval D of the section with the reference lost interval $D_{ist\_Thd}$ and setting a route capable of executing navigation driving by lateral autonomous control only when the lane lost interval is less than the reference lost interval.

A maximum value of the reference lateral error value Lat_Thd for comparing the lateral error value and a maximum value of the reference heading error value Head_Thd for comparing the heading error value may be set to more accurate values for each lane lost section by means of data experientially obtained by real driving of the vehicle.

Furthermore, S300 may include generating (S310) a control signal for operating a steering device of the vehicle such that the vehicle which enters the lane lost section follows a driving route at a current position and transmitting the control signal to a lateral torque controller of the vehicle. In particular, S310 may include performing proportional integral derivation (PID) control of the steering device such that the vehicle follows the driving route to travel using a position error value S of the vehicle, in which the vehicle which is traveling on the lane lost section is spaced apart from the driving route connecting the waypoints and a distance d between the current most adjacent waypoint and a waypoint subsequently located.

Accordingly, S310 may include calculating a lateral distance from a waypoint set in the nearest place from the current position of the vehicle as a lateral error $e_y$, and calculating a difference between a steering yaw w of a direction the vehicle currently faces and a desired yaw $\Psi_d$ the vehicle should follow on the driving route as a heading error $e_\psi$. In particular, the desired yaw $\Psi_d$ may be defined as an angle formed by a straight line connecting the waypoint where the lateral distance is calculated with a subsequent waypoint. Additionally, S310 may include calculating the position error value S of the vehicle, in which the vehicle is spaced apart from the driving route, using a relationship equation between the lateral error $e_y$ and the heading error $e_\psi$, and generating the amount of steering control for operating the steering device to control a steering yaw in a direction where it is able to minimize the position error value as a control signal.

Furthermore, S300 may further include determining (S320) whether a situation to end the autonomous control of the lateral motion which is executing in the lane lost section by the control signal generated in S310 occurs. In particular, as shown in FIG. 10, S320 may include stopping to generate the control signal for the autonomous control of the lateral motion to execute manual driving, when there is a steering torque input from the driver, and notify the driver of it.

As shown in FIG. 10, S320 may include determining whether the vehicle arrives at a position within a certain distance from the final waypoint on the driving route and stop positioning of the vehicle and the autonomous control of the lateral motion according to the positioning and execute a camera-based lateral control mode, when the vehicle enters the position within the certain distance and when the line is recognized by the camera module.

As further shown in FIG. 10, S320 may include, when the line is not recognized by the camera module after the vehicle enters the position within the certain distance from the final waypoint on the driving route, determining whether a distance where the vehicle travels on the lane lost section is greater than a predetermined maximum navigation driving distance and stopping the autonomous control of the lateral motion to execute manual driving and notifying the driver that the autonomous control of the lateral motion is ended, when the distance where the vehicle travels on the lane lost section is greater than the predetermined maximum navigation driving distance.

The autonomous control method for the lateral motion according to another embodiment of the present disclosure may further include displaying (S400) the virtual line guiding the driver along the driving route in the lane lost section together with a road image indicating the road where the vehicle is traveling on a display module of the vehicle. In particular, S400 may include displaying whether a camera-based lateral control mode is being executed or when autonomous control of lateral motion based on vehicle positioning in the lane lost section is being executed using icons of different shapes.

Furthermore, S400 may include displaying the driving route guided by the virtual line on the display module in the lane lost section as well as a section where there is a line. Thus, because it is able for the driver to visually recognize whether the driving route guided by the virtual line is valid in a current road situation capable of being visually identified, it may contribute to rapidly determining whether to maintain the execution of the autonomous control for the lateral motion or whether to switch to manual driving.

Embodiments of the present disclosure may identify a degree to which the vehicle travels in a lateral direction within a virtual line and may perform autonomous control for preventing lateral departure, in a temporal lane lost section in which a reference value is not obtained from the line or the like by the camera module. Furthermore, embodiments of the present disclosure may visualize a driving route formed by a virtual line and may display the driving route on the display module, such that the driver intuitively recognizes the driving route, thus rapidly determining whether the virtual line and the driving route are valid. In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An autonomous controller for lateral motion, the autonomous controller comprising:
   a vehicle positioning module configured to calculate a lateral departure degree from the center of a virtual line after a line is lost using position information of a vehicle, wherein the position information is derived by data obtained from the vehicle which is traveling;
   a driving route determination module configured to determine the virtual line connecting waypoints previously generated on a map for a section where the line is lost to connect an old line with a new line as a driving route; and a lateral control module configured to perform lateral autonomous control of the vehicle in a direction where the lateral departure degree is minimized to cause the vehicle to follow the driving route connecting waypoints set on the virtual line to travel, wherein the vehicle positioning module includes an initial position setting device configured to set a position of the vehicle at a time before the line is lost to an initial position for estimating a subsequent position change.

2. The autonomous controller of claim 1, wherein the vehicle positioning module is configured to localize the vehicle using dead reckoning and estimate the lateral departure degree from the center of the virtual line.

3. The autonomous controller of claim 1, wherein the vehicle positioning module includes:

a global position change rate deriving device configured to obtain a position information change rate of the vehicle on global coordinates from driving information obtained from the vehicle which travels on a lane lost section; and a vehicle positioning device configured to identify a position of the vehicle which travels on the virtual line by calculating vehicle movement information in a longitudinal direction and a lateral direction using the position information change rate of the vehicle and accumulating and storing the vehicle movement information in the initial position to calculate the lateral departure degree of the vehicle on local coordinates.

4. The autonomous controller of claim 3, wherein the global position change rate deriving device is configured to derive the position information change rate of the vehicle moving on the global coordinates by the driving information including a lateral acceleration of the vehicle, a yaw angle of the vehicle, a lateral slip angle of the vehicle, a front-wheel steering angle, and a rear-wheel steering angle obtained from the vehicle and specification information including a distance from the center of gravity of the vehicle to a front wheel axle and a distance from the center of gravity of the vehicle to a rear wheel axle.

5. The autonomous controller of claim 3, wherein the vehicle positioning device is configured to integrate the position information change rate of the vehicle to calculate the movement information of the vehicle traveling in the longitudinal direction and the lateral direction and accumulate and store the movement information of the vehicle in the initial position to identify the lateral departure degree of the vehicle on the local coordinates.

6. The autonomous controller of claim 1, wherein the driving route determination module includes:

a route setting device configured to determine whether there is a lane lost section capable of performing autonomous control of lateral motion as at least one waypoint is set in front of the road where the vehicle is traveling and set the virtual line connecting the waypoints set for the lane lost section to the driving route for performing the autonomous control of the lateral motion.

7. The autonomous controller of claim 1, wherein the driving route determination module includes:

a lane lost interval setting device configured to set a maximum distance of a lane lost section capable of performing autonomous control of lateral motion to a reference lost interval to perform the autonomous control of the lateral motion in only a temporary lane lost section.

8. The autonomous controller of claim 7, wherein the lane lost interval setting device is configured to set a distance where a lateral error value accumulated while the vehicle travels on the lane lost section is less than or equal to a reference lateral error value set based on the center of the line and where a heading error value indicating a degree to which the vehicle is misaligned from the line is less than or equal to a predetermined reference heading error value to the reference lost interval.

9. The autonomous controller of claim 1, wherein the lateral control module includes:

a steering controller configured to generate a control signal for operating a steering device of the vehicle to cause the vehicle traveling on a lane lost section to follow the driving route connecting the waypoints and transmit the control signal to a lateral torque controller of the vehicle.

10. The autonomous controller of claim 9, wherein the steering controller is configured to perform proportional integral derivation (MD) control of the steering device to cause the vehicle to follow the driving route to travel, using a position error value of the vehicle, the position error value in which the vehicle traveling on the lane lost section is spaced apart from the driving route connecting the waypoints, and a distance between the current most adjacent waypoint and a waypoint subsequently located.

11. The autonomous controller of claim 10, wherein the steering controller is configured to:

calculate a lateral distance from a waypoint set on the nearest place from a current position of the vehicle as a lateral error of the vehicle;

set a yaw formed by a straight line connecting the waypoint where the lateral distance is calculated with a subsequent waypoint to a desired yaw the vehicle should follow to calculate a difference between a steering yaw of a direction the vehicle currently faces and the desired yaw as a heading error; and calculate the position error value of the vehicle using a relationship equation between the lateral error and the heading error.

12. The autonomous controller of claim 9, wherein the lateral control module further includes:

a control end determining device configured to stop generating the control signal at the steering controller to execute manual driving, in response to receiving a steering torque input from a driver, and notify the driver that autonomous control of lateral motion is ended.

13. The autonomous controller of claim 9, wherein the lateral control module further includes:

a control end determining device configured to determine whether the vehicle arrives at a position within a certain distance from a final waypoint on the driving route and stop autonomous control of lateral motion based on positioning of the vehicle and execute camera-based lateral control, in response to determining that the vehicle enters the position within the certain distance and the line is recognized by a camera module.

14. The autonomous controller of claim 9, wherein the lateral control module further includes:

a control end determining device configured to determine whether a distance where the vehicle travels on the lane lost section is greater than a predetermined maximum navigation driving distance, in response to determining that the line is not recognized after the vehicle enters a portion within a certain distance from a final waypoint on the driving route, and stop autonomous control of lateral motion to execute manual driving and notify the driver that the autonomous control of the lateral motion is ended, in response to determining that the distance where the vehicle travels on the lane lost section is greater than the predetermined maximum navigation driving distance.

15. The autonomous controller of claim 1, further comprising:
a display control module configured to display the virtual line set by the driving route determination module together with a road image indicating a road where the vehicle is traveling on a display module of the vehicle, wherein the display control module includes:
a function activation display configured to display whether autonomous control of lateral motion is performed based on vehicle positioning on the display module; and
a line visualization display configured to display the virtual line set for a lane lost section on the display module to allow a driver to visually recognize whether the driving route is valid.

16. An autonomous control method for lateral motion, the autonomous control method comprising:
calculating, by a controller, a lateral departure degree from the center of a virtual line after a line is lost using position information of a vehicle, wherein the position information is derived by data obtained from the vehicle which is traveling;
determining, by the controller, the virtual line connecting waypoints previously generated on a map for a section where the line is lost to connect an old line with a new line as a driving route;
performing, by the controller, lateral autonomous control of the vehicle in a direction where the lateral departure degree is minimized to cause the vehicle to follow the driving route connecting waypoints set on the virtual line to travel; and
setting, by the controller, a position of the vehicle at a time before the line is lost to an initial position for estimating a subsequent position change.

17. The autonomous control method of claim 16, wherein the calculating of the lateral departure degree includes:
obtaining, by the controller, a position information change rate of the vehicle on global coordinates from driving information obtained from the vehicle which travels on a lane lost section; and
identifying, by the controller, a position of the vehicle traveling on the virtual line by calculating vehicle movement information in a longitudinal direction and a lateral direction using the position information change rate of the vehicle and accumulating and storing the vehicle movement information in the initial position to calculate the lateral departure degree of the vehicle on local coordinates.

18. The autonomous control method of claim 16, wherein the determining of the virtual line as the driving route includes:
setting, by the controller, a maximum distance of a lane lost section capable of performing autonomous control of lateral motion to a reference lost interval to perform the autonomous control of the lateral motion in only a temporary lane lost section; and
determining, by the controller, whether there is a lane lost section capable of performing the autonomous control of the lateral motion as at least one waypoint is set in front of a road where the vehicle is traveling and setting the virtual line connecting the waypoints set for the lane lost section to the driving route for performing the autonomous control of the lateral motion.

19. The autonomous control method of claim 16, wherein the performing of the lateral autonomous control of the vehicle includes:
performing, by the controller, proportional integral derivation (MD) control of a steering device to cause the vehicle to follow the driving route to travel, using a position error value of the vehicle, the position error value in which the vehicle traveling on a lane lost section is spaced apart from the driving route connecting the waypoints and a distance between the current most adjacent waypoint and a waypoint subsequently located.

20. The autonomous control method of claim 16, further comprising:
displaying, by the controller, the virtual line guiding a driver along the driving route on a lane lost section together with a road image indicating a road where the vehicle is traveling on a display module of the vehicle.

* * * * *